United States Patent [19]

Nagazumi et al.

[11] 3,837,669

[45] Sept. 24, 1974

[54] PROTECTOR BAG STORAGE DEVICE OF MOTOR VEHICLE SAFETY DEVICE

[75] Inventors: Yasuo Nagazumi, Tokyo; Tokuichiro Hosaka, Yokohama; Kohei Maeda, Tokyo, all of Japan

[73] Assignee: Nissan Motor Company Limited, Yokohama City, Japan

[22] Filed: Feb. 10, 1972

[21] Appl. No.: 225,080

[30] Foreign Application Priority Data
Feb. 15, 1971  Japan................................. 46-6607

[52] U.S. Cl. .......... 280/150 AB, 29/427, 220/89 A, 225/106
[51] Int. Cl. ........................................... B60r 21/08
[58] Field of Search ............ 280/150 AB; 220/89 A; 225/106; 29/415, 416, 427

[56] References Cited
UNITED STATES PATENTS

| | | | |
|---|---|---|---|
| 3,532,360 | 10/1970 | Leising et al. | 280/150 AB |
| 3,539,200 | 11/1970 | Chute | 280/150 AB |
| 3,622,176 | 11/1971 | Byer | 280/150 AB |
| 3,625,543 | 12/1971 | Wolff | 280/150 AB |
| 3,632,133 | 1/1972 | Haas | 280/150 AB |
| 3,640,546 | 2/1972 | Brawn | 280/150 AB |
| 3,656,790 | 4/1972 | Truesdell | 280/150 AB X |

FOREIGN PATENTS OR APPLICATIONS
1,024,611  3/1966  Great Britain........................ 220/48

*Primary Examiner*—Robert J. Spar
*Assistant Examiner*—Leslie J. Paperner
*Attorney, Agent, or Firm*—Robert E. Burns; Emmanuel J. Lobato; Bruce L. Adams

[57] ABSTRACT

In order to protect a vehicle occupant from being hurt by collision with a considerably hard container of a protector bag which is held in a folded position in a motor vehicle apparatus in which the protector bag is expanded between the vehicle occupant and a structural part of the vehicle cabin, the protector bag is usually stowed in a storage device including cushioning means which cover the folded protector bag when the safety apparatus is held in an inoperative condition and which is readily released from the protector bag when the protector bag is expanded with pressurized fluid blown thereinto in the event the motor vehicle encounters a collision.

5 Claims, 10 Drawing Figures

PROTECTOR BAG STORAGE DEVICE OF MOTOR VEHICLE SAFETY DEVICE

The present invention relates to safety apparatus for motor vehicles and, more particularly, to a motor safety apparatus which is adapted to protect an occupant of the motor vehicle from injury in the event of a collision of the vehicle. The safety apparatus to which the present invention is directed is specifically of the character which uses an expansible protector bag having a folded or collapsed inoperative position and an expanded operative position to restrain movement of the vehicle occupant during the collision condition. The expandible protector bag is usually stowed in any part or parts of the vehicle cabin in its collapsed condition and is expanded and projected to a position intervening between the vehicle occupant such as the vehicle driver and structural parts such as a windshield, an instrument panel, a steering wheel or column and a seat back of the vehicle cabin. The shocks and impacts that would otherwise be totally imparted to the vehicle occupant as a result of the collision condition can thus be absorbed or dampened by the expanded protector bag. The protector bag is expanded and projected to the protective position by suitable fluid under pressure which is supplied from a suitable source of pressurized fluid as soon as the collision condition is encountered by the motor vehicle. This collision condition is responded to by suitable impact absorbing means which is associated with the protector bag and the source of the pressurized fluid. This impact-responsive means usually includes sensor means to detect the collision condition of the motor vehicle and rupturable sealing means which is adapted to seal off the source of the pressurized fluid and to instantaneously open the source of the pressurized fluid when the impact-responsive means is initiated into action in response to the collision condition. All these means are well known in the art and, as such, no detailed description of the construction and operation of such means will be herein incorporated.

When maintained in the stowed inoperative position, the expansible protector bag is usually closely folded or collapsed in a practically solid and accordingly considerably hard container whensoever the protector bag is located in the vehicle cabin so as to meet the space requirement. In case, therefore, the vehicle occupant inadvertently or accidentally strikes against such bulk of the folded or collapsed protector bag during cruising of the motor vehicle, it sometimes happens that the occupant is seriously hurt and, if the occupant is the vehicle driver, the driver will no longer be able to properly steer the motor vehicle so as to invite a more serious danger.

It is, thus, an object of the present invention to provide an improved motor vehicle safety apparatus having an expansible protector bag which is adapted to prevent the vehicle occupant from striking against the relatively hard structural parts of the vehicle cabin during the collision of the motor vehicle and which is so arranged as to protect the occupant from being hurt even though the occupant inadvertently or accidentally collides with the container or releasable pad of the folded protector bag when the safety apparatus is held in the inoperative condition.

It is another object of the present invention to provide a protector bag storage device for use in the motor vehicle safety apparatus having an expansible protector bag so as to protect the vehicle occupant from directly striking against the considerably hard container or pad of the folded or collapsed protector bag even when the occupant inadvertently or accidentally collides with the protector bag storage device during the condition in which the safety apparatus is maintained in its inoperative condition.

It is still another object of the present invention to provide a protector bag storage device which is simple in construction to suit the installation in the limited space of the motor vehicle and economical to manufacture on a commercial production basis.

In general, these and other objects and features of this invention are attained basically in a safety apparatus having a protector bag storage device which includes retaining means which is held stationary relative to the motor vehicle and to which the expandible protector bag is secured at its open end edge substantially defining an opening through which the protector bag is in communication with the source of the pressurized fluid and releasable cushioning means which is secured by the retaining means in a position to cover exposed portions of the protector bag which is held in the collapsed or folded inoperative position for protecting the vehicle occupant from being hurt when the occupant happens to inadvertently or accidentally strike against the considerably hard bulk of the folded or collapsed protector bag. The cushioning means is released from the protector bag so as to allow the protector bag to be freely expanded to its full capacity with the pressurized fluid blown thereinto under the collision condition of the motor vehicle. Thus, this releasable cushioning means may comprise an elastic cover member supported by the retaining means and an elastic liner which is attached to at least a portion of the inner surface of the cover member so as to be held in substantially in contact with the exposed portions of the protector bag in the folded or collapsed position. The cover member and liner making up the cushioning means are made of materials which are sufficiently soft and elastic and are rupturable, burstable or frangible or otherwise instantaneously removable from the retaining means when the protector bag is to be expanded to its full capacity during the collision condition. The protector bag and the associated retaining and cushioning means may be mounted anywhere in the vehicle cabin such as on the steering wheel or instrument panel to protect the occupant of the front seat or on the seat back of the front seat to protect the occupant of the rear seat.

The nature and advantages of the safety apparatus according to the present invention will become more apparent from the following description taken in conjunction with the accompanying drawings in which like reference numerals designate corresponding parts throughout different figures and in which.

Figure 1:
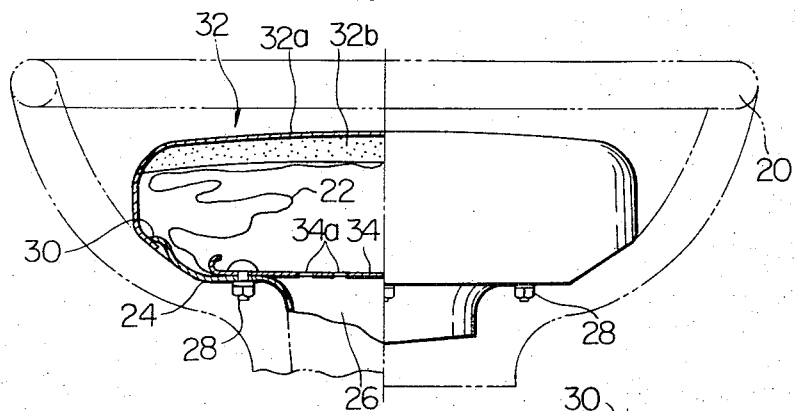
FIG. 1 is a combination cross-sectional and side-elevational view showing a preferred embodiment of the protector bag storage device of the safety apparatus according to the present invention, the storage device being herein shown as maintained in its inoperative condition with the expansible protector bag folded within the storage device.
Figure 2:
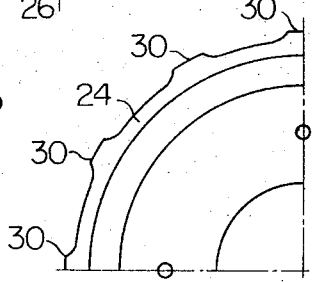
FIG. 2 is a fragmentary plan view showing an example of the configurations of the retainer forming part of the storage device shown in FIG. 1.
Figure 3:
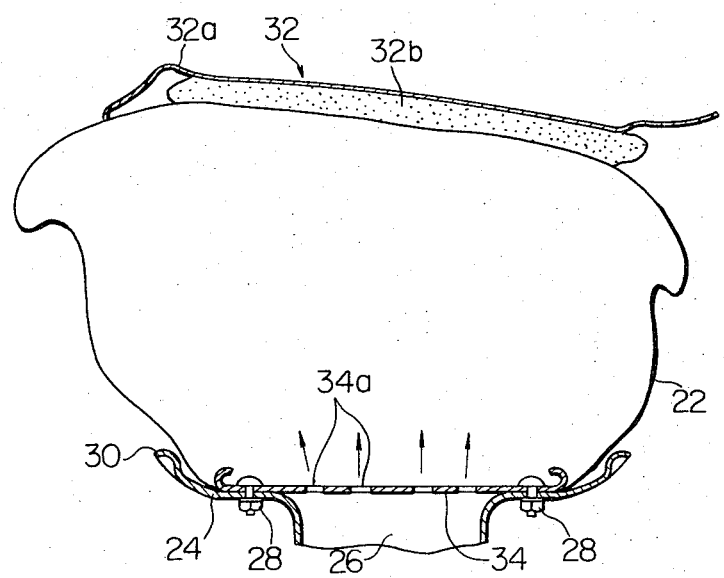
FIG. 3 is a cross-sectional view showing the storage device illustrated in FIG. 1 is made operative with the protector bag expanded to the protective position.

Reference is now made concurrently to FIGS. 1 to 3 which show a first preferred embodiment of the protector bag storage device of the safety apparatus according to the present invention. As seen in FIG. 1, the storage device is herein assumed simply by way of example to be mounted on a steering wheel 20 of the motor vehicle as indicated by phantom lines. The storage device has received therein an expansible protector bag 22 which is shown as held in a folded inoperative position. This storage device includes a retainer 24 which is generally in the form of an annular disc having a central aperture, not numbered. This retainer 24 is usually made of a rigid material and is herein shown as integral with a structure providing a fluid passage 26 which is in communication with a source (not shown) of a fluid under pressure. The expansible protector bag 22 is received on this retainer 24 in its folded position and is bolted or otherwise securly fastened at its end edge to the retainer 24 so that communication is established between the interior of the protector bag 22 and the fluid passage 26 through the central aperture formed in the retainer 24. In the embodiment shown, the protector bag 22 is secured to the retainer 24 by means of bolts which are commonly designated by reference numeral 28. The retainer 24 has at its outer circumferential edge a number of substantially equidistantly spaced, outwardly directed knife edge portions, which are also commonly designated by reference numeral 30 in FIG. 2. The protector bag storage device further includes a cushioning means 32 which is secured at its end edge to the retainer 24 by the bolts 28 in a manner to substantially cover exposed portions of the expansible protector bag 22 which is maintained in the folded inoperative position as shown in FIG. 1. The cushioning means 32 is made up of a flexible cover member 32a which may be made of a material containing polyurethane and a pliable liner 32a which may be made of foamed polyurethane and which is attached to an inner surface of the cover member 32a. The liner 32b is thus substantially in contact with the exposed portions of the folded protector bag 22 which is snugly received between the retainer 24 and the cushioning means 32 as seen in FIG. 1. The cover member 32a is loosely in abutting engagement with the knife edge portions 30 of the retainer 24 on its inner surface adjacent its generally circular end edge. Designated by reference numeral 34 in FIGS. 1 and 3 is a diffuser plate which is rigidly supported on the retainer 24 by the bolts 28 and which is formed with a number of apertures 34a through which the fluid passage 26 communicates with the interior of the protector bag 22.

With the protector bag storage device of the safety apparatus according to the present invention thus constructed, when a collision is encountered by the motor vehicle and the fluid under pressure is directed to the interior of the protector bag 22 through the fluid passage 26 and the apertures 34a in the diffuser plate 34, then the protector bag 22 is expanded from the folded inoperative position which has thus far been established. At the initial stage of the expansion, an opposing force will be imparted to the expanding protector bag 22 by the cushioning means 32 due to the tension produced in the cover member 32a of the cushioning means. As the fluid pressure in the protector bag 22 increases with the pressurized fluid blown thereinto, the tension in the cover member 32a of the cushioning means 32 increases so that the cover member 32a is forcefully pressed upon the knife edge portions 30 of the retainer 24. The knife edge portions 30 thus bite home into the cover member 32a of the cushioning means 32 until the cover member is severed or ruptured and freed from the retainer 24. As a consequence, the protector bag 22 is allowed to be expanded to its full capacity and projected or flung to a predetermined protective position intervening between the vehicle occupant and the structural parts of the vehicle cabin. Such operative conditions of the protector bag 22 and protector bag storage device are seen in FIG. 3. When, thus, the protector bag 22 is expanded and projected during the collision condition of the motor vehicle, the cover member 32a and liner 32b of the cushioning means 32 will be torn apart or broken into pieces and thrown toward the vehicle occupant and, in some cases, will impinge upon the vehicle occupant. The vehicle occupant can be protected from being hurt even in such cases, because both the cover member 32a and the liner 32b of the cushioning means 32 are made of sufficiently soft materials such as the polyurethane and foamed polyurethane.

Although the retainer 24 and accordingly the cushioning means 32 have thus far been described and shown as generally circular in section, such is solely by way of example and, therefore, they may be configured in any desired manner insofar as the protector bag 22 is snugly retained therebetween and can be instantaneously freed from the restraint during the collision condition. It may also be noted that the knife portions 30 of the retainer 24 can be disposed in any desired manner although they have been described as substantially equidistantly spaced from each other at the entire periphery of the retainer. If desired, therefore, the retainer 24 may be provided with a continuous knife edge at its entire periphery.

Figure 4:
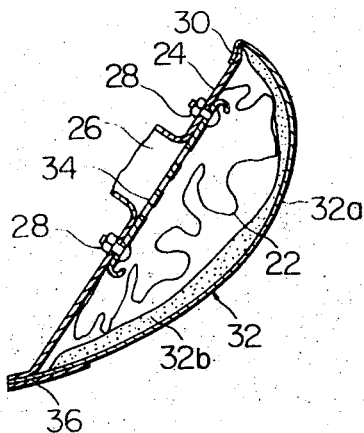
FIG. 4 is a cross-sectional view of another preferred embodiment of the protector bag storage device of the safety apparatus according to the present invention, the storage device being shown as held in its inoperative condition.
Figure 5:
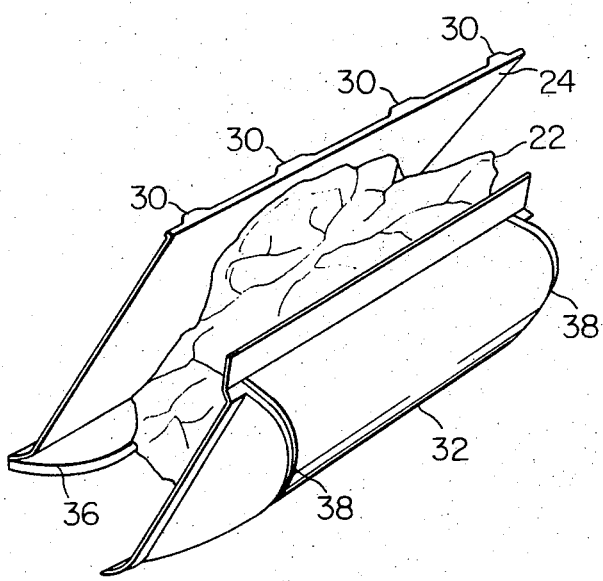
FIG. 5 is an exploded perspective view of the storage device shown in FIG. 4.
Figure 6:
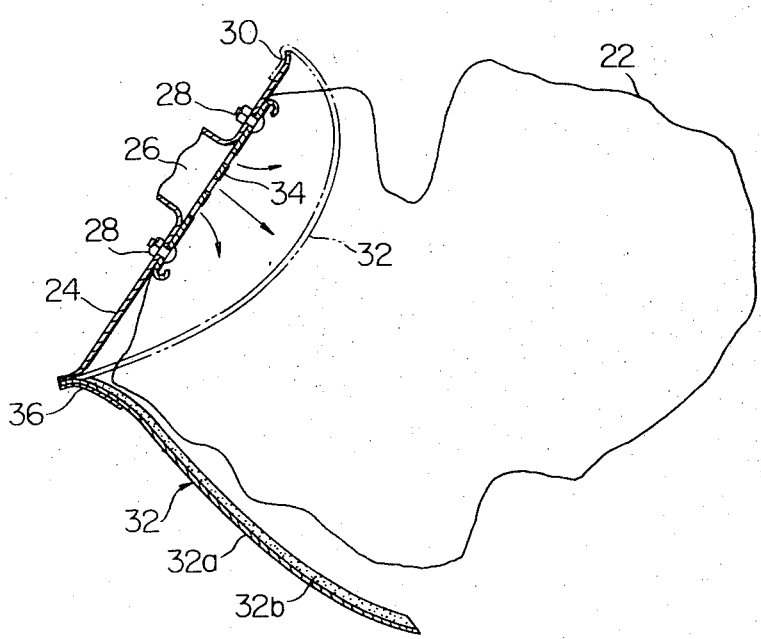
FIG. 6 is a cross-sectional view showing the condition in which the storage device shown in FIGS. 4 and 5 is made operative with the protector bag being expanded.

The embodiment above described is specifically adapted for installation on the steering wheel of the motor vehicle for the protection of the vehicle driver. The protector bag storage device of the safety apparatus according to the present invention can, however, be located anywhere in the vehicle cabin depending upon the user requirements. FIGS. 4 to 6 illustrate an embodiment which is adapted to be mounted on a suitable stationary part of the vehicle cabin such as the instrument panel for the protection of the occupant of the front seat or the seat back of the front seat for the protection of the rear seat.

Referring to FIGS. 4 to 6, the protector bag storage device of the modified construction includes a retainer 24 which is generally in the form of a centrally apertured plate and a cushioning means 32 including a cover member 32a and a liner 32b attached to the inner surface of the cover member 32a whereby the expansible protector bag 20 is snugly accommodated between the retainer and cushioning means when the protector bag is held in the folded inoperative position, similarly to the device shown in FIGS. 1 to 3. Different from the device shown in FIGS. 1 to 3, the cushioning means 32 of the protector bag storage device herein shown has its cover member 32a securely connected at one end portion to a support member 36 which is made of a relatively hard material resistant to a bending stress and which is rigidly connected to one end portion of the retainer 24. The cover member 32a, moreover, has its opposite end portion supported on the other end portion of the retainer 24 at which spaced knife edge portions 30 are formed as seen in FIG. 5. The cover member 32a being supported in this manner, the cushioning means 32 in its entirety is caused to pivotally move about the end edge of the support member 36 when the protector bag 22 received by the cushioning means is caused to expand and the cover member 32a is accordingly disengaged from the end edge of the retainer 24 at which the knife edge portions 30 are formed, as will be clearly seen in FIG. 6. In order that the cushioning means 32 be capable of being pivotally moved about the end edge of the support member 36 as a result of the expansion of the protector bag 22, the cover member 32a may be formed with a suitable number of generally linear thinned portions or grooves 38 extending from one end edge of the other of the cover member, viz., in a direction generally perpendicular to the axis of rotation of the cushioning means 32, as seen in FIG. 5.

The protector storage device above described operates essentially similarly to the device shown in FIGS. 1 to 3. The device of FIGS. 4 to 6, however, has advantages in that the cover member 32a and liner 32b of the cushioning means 32 are prevented from being broken into pieces when the cushioning means is released from the protector bag 22 during the collision condition and in that, because the expansion of the protector bag 22 is locally limited by the support member 36, the protector bag is prevented from unnecessarily expanded at its portion remote from its leading end as has been experienced in the conventional safety apparatus using the expansible protector bag. In order to more effectively limit the expansion of the protector bag 22 during operation of the storage device above described, the support member 36 may be appropriately configured in a manner to properly guide protector bag which is expanding. Thus, the support member 36 may be outwardly warped to an appreciable degree as seen in FIG. 5.

Figure 7:
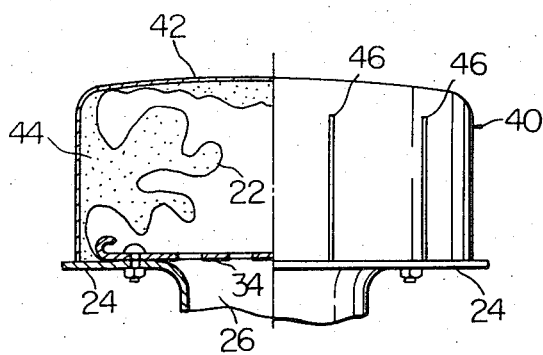
FIG. 7 is a combination cross-sectional and side-elevational view showing still another preferred embodiment of the protector bag storage device of the safety apparatus according to the present invention.
Figure 8:
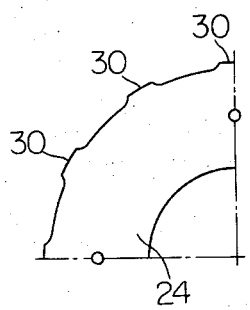
FIG. 8 is a fragmentary plan view showing an example of the configuration of the retainer forming part of the storage device shown in FIG. 7.
Figure 9:
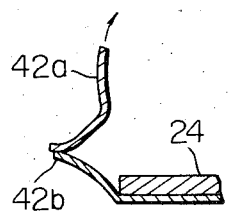
FIG. 9 is a fragmentary sectional view showing essential parts of the device of FIG. 7 which is in the process of being made operative.

FIGS. 7 to 9 illustrate a third preferred embodiment of the storage device of the safety apparatus according to the present invention. The storage device as shown in constructed essentially similarly to the embodiment shown in FIGS. 1 to 3, except in that the protector bag 22 has its leading end portion shared with a substantially central portion of the cover member of the cushioning means which is now designated by reference numeral 40 as seen in FIG. 7 and in that the cover member, denoted by reference numeral 42, of the cushioning means 40 is made up of two sections 42a and 42b which are detachably bonded to each other as seen in FIG. 9 whereby the sections 42a and 42b are separated from each other when the protector bag 22 is expanded within the cushioning means 40 during the collision condition of the motor vehicle. The cushioning means 40 also has a liner or filler 44 which is made of a foamed polyurethane or any other material having a relatively low mechanical strength and which is interposed between the cover member 42 of the cushioning means and the protector bag 22 as seen in FIG. 7. The retainer 24 also has formed at its outer circumferential edge a plurality of spaced knife edge portions 30 which are positioned relative to the parting line between the sections 42a and 42b of the cover member 42 so that these sections are separated from each other by the cutting action of the knife edge portions 30 when the protector bag 22 is expanded and the cover member 42 is forced forward, viz., in the direction of arrow in FIG. 9. In order that the cover member 42 of the cushioning means 40 be readily ruptured or torn apart by the expansion of the protector bag 22 during the collision condition, the cover member 42 may be preferably formed with a suitable number of generally linear thinned portions or grooves 46 extending in the direction substantially in parallel to the direction in which the pressurized fluid is admitted into the protector bag during operation of the storage device. These grooves 46 will significantly assist in the breaking tendency of the cushioning means 40 so as to enable the protector bag 22 to be instantaneously expanded when blown with the pressurized fluid.

Figure 10:
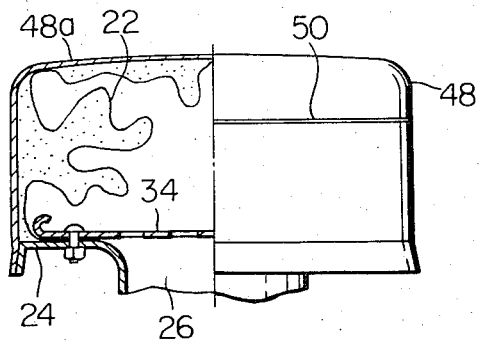
FIG. 10 is a view similar to FIG. 7 but now illustrates a modification of the embodiment which is shown in FIGS. 7 to 9.

FIG. 10 is a view showing a modification of the embodiment which is illustrated in FIGS. 7 to 9, wherein the cushioning means, now designated by reference numeral 48, has a unitary cover member 48a which is detachably bonded at its end edge portion to a circumferential edge of the retainer 24 which is generally in the form of an annular disc. For the reason as set forth in connection with the embodiment of FIGS. 7 to 9, the cover member 48a may be formed with a circumferentially extending, thinned portion or groove 50 so that the cushioning means 48 is readily severed by the expansion of the protector bag 22 therewithin.

It will now be appreciated from the foregoing description that the protector bag storage device of the motor vehicle safety apparatus according to the present invention is expected to contribute to enhancing the safety of the vehicle occupant either during collision of the motor vehicle or during the inoperative condition of the safety apparatus because of the specific construction and arrangement of the storage device. Thus, in case the vehicle occupant inadvertently or accidentally strikes against the protector bag storage device during cruising of the motor vehicle, the occupant is prevented from being hurt because the impact between the occupant and the storage device can be absorbed or moderated by the cushioning means covering the folded protector bag. In view, moreover, of the limited number of the parts and elements, the protector bag storage device herein disclosed will be manufactured at low costs and therefore will be acceptable widely on a commercial basis.

What is claimed is:

1. In a safety apparatus for protecting an occupant of a motor vehicle during a collision of the motor vehicle and having an inflatable confinement having an open end portion which is receptive of a supply of pressurized fluid for inflating the confinement from a collapsed inoperative state to an expanded operative state: a rupturable flexible cover member comprising two separate pieces and covering the inflatable confinement when same is in the collapsed state; a pliable filler connected to said cover member and disposed between said cover member and the inflatable confinement directly contacting both of them and completely filling the space therebetween; means for effecting the rupturing of said cover member in response to the inflation of the confinement; and means for releasably retaining the two pieces of said cover member about the inflatable confinement and for completely detaching one piece in response to the inflation of the confinement into the expanded state comprising means bonding the two pieces together for separation in response to the inflation of the confinement into the expanded state.

2. In a safety apparatus according to claim 1, wherein said cover member comprises material containing polyurethane.

3. In a safety apparatus according to claim 1, wherein said lining comprises polyurethane.

4. In a safety apparatus according to claim 1, wherein said means for effecting the rupturing of said means defining cover member comprises at least one circumferential groove in said cover member.

5. In a safety apparatus according to claim 1 wherein said means for effecting the rupturing of said cover member comprises means defining a plurality of grooves in said cover member having an axis substantially in parallel with the direction of expansion of the confinement.

* * * * *